United States Patent [19]
Kumata et al.

[11] 4,194,916
[45] Mar. 25, 1980

[54] REVERSIBLY PHOTOSENSITIVE GLASS

[75] Inventors: Ken Kumata, Musashi-Murayama; Hiroshi Namikawa, Tokyo, both of Japan

[73] Assignee: Agency of Industrial Science & Technology, Ministry of International Trade & Industry, Tokyo, Japan

[21] Appl. No.: 18,945

[22] Filed: Mar. 9, 1979

[30] Foreign Application Priority Data

May 16, 1978 [JP] Japan ............................... 53-57183

[51] Int. Cl.² ........................ C03C 3/26; C03C 3/12
[52] U.S. Cl. ........................... 106/47 R; 106/DIG. 6
[58] Field of Search ................. 106/47 R, DIG. 6

[56] References Cited
U.S. PATENT DOCUMENTS

| | | | |
|---|---|---|---|
| 3,615,761 | 10/1971 | Sakka et al. | 106/DIG. 6 |
| 3,615,771 | 10/1971 | Meiling | 106/DIG. 6 |
| 3,902,909 | 9/1975 | Gliemeroth | 106/DIG. 6 |
| 3,950,591 | 4/1976 | Gliemeroth et al. | 106/DIG. 6 |

*Primary Examiner*—O. R. Vertiz
*Assistant Examiner*—Mark Bell
*Attorney, Agent, or Firm*—Oblon, Fisher, Spivak, McClelland & Maier

[57] ABSTRACT

A reversibly photosensitive glass consisting of cadmium oxide, germanium dioxide, sodium oxide and thallous oxide. A reversibly photosensitive glass consisting of silicon dioxide, sodium oxide, cadmium oxide and thallous oxide.

1 Claim, 4 Drawing Figures

REVERSIBLY PHOTOSENSITIVE GLASS

BACKGROUND OF THE INVENTION

The present invention relates to a glass whose transmittance to ultraviolet rays and visible rays is such that the glass loses transmittance upon exposure to ultraviolet rays and recovers transmittance at a very slow rate in a dark place at room temperature, at an accelerated rate upon exposure to long-wavelength rays and at a very rapid rate upon exposure to heat. Because of its ability to lose and regain transmittance, the glass according to the present invention is referred to as "reversibly photosensitive glass".

Reversibly photosensitive glasses have been known heretofore and it is a property of such glasses to vary in transmittance to light in a reversible manner in accordance with the quantity of sunlight impinging thereon. Thus, such glasses have been used for sunglasses, for example. Since reversibly photosensitive glasses have an additional advantageous feature of not requiring aftertreatments such as image development, studies on the feasibility of such glasses in applications to optical memories and other optical data processing devices are now under way.

The borosilicate glass precipitating a minute amount of silver halide ["Photochromic Silicate Glass Sensitized by Silver Halides", W. H. Armistead et al, Science, Vol. 144, No. 3615, 150–154 (1964)] is but one example of such glasses which have heretofore been put to practical use. Since these glasses have been developed mainly for use in sunglasses, they are characterized by the property of assuming a dark color and accordingly losing transmittance upon exposure to darkening lights and, upon exposure to normal indoor conditions of room temperature, quickly losing the dark color and recovering their transmittance. This characteristic property, however, turns out to be a disadvantage when the glasses are to be used such as in optical memories which are primarily aimed at preserving images and figures for a long period of time. Furthermore it is desired that the glasses have high darkening sensitivity.

An object of this invention is to provide a reversibly photosensitive glass which recovers the lost transmittance at a very slow rate in a dark place at room temperature and responds with high sensitivity to the darkening light.

Another object of this invention is to provide a reversibly photosensitive glass which readily recovers transmittance upon exposure to long-wavelength rays or to heat.

SUMMARY OF THE INVENTION

To accomplish the objects described above according to the present invention, there are provided a reversibly photosensitive glass which consists of a composition having CdO, $GeO_2$ and $Na_2O$ in the proportions falling within the area of a ternary diagram defined by 0 and 32 mol% of CdO, 51 and 85 mol% of $GeO_2$ and 10 and 40 mol% of $Na_2O$, and 0.1 to 3 mol%, based on the combined amount of the three components mentioned above, of $Tl_2O$; and a reversibly photosensitive glass which consists of a composition having CdO, $SiO_2$ and $Na_2O$ in the proportions falling within the area of a ternary diagram defined by 15 and 40 mol% of CdO, 40 and 80 mol% of $SiO_2$ and 5 and 35 mol% of $Na_2O$, and 0.1 to 3 mol%, based on the combined amount of the three components mentioned above, of $Tl_2O$. These reversibly photosensitive glasses are composed solely of the respective components mentioned above and do not contain any other components with the exception of traces of impurities inevitably entrained into the glasses by the components used as raw materials.

DESCRIPTION OF THE PREFERRED EMBODIMENTS

Figure 1:
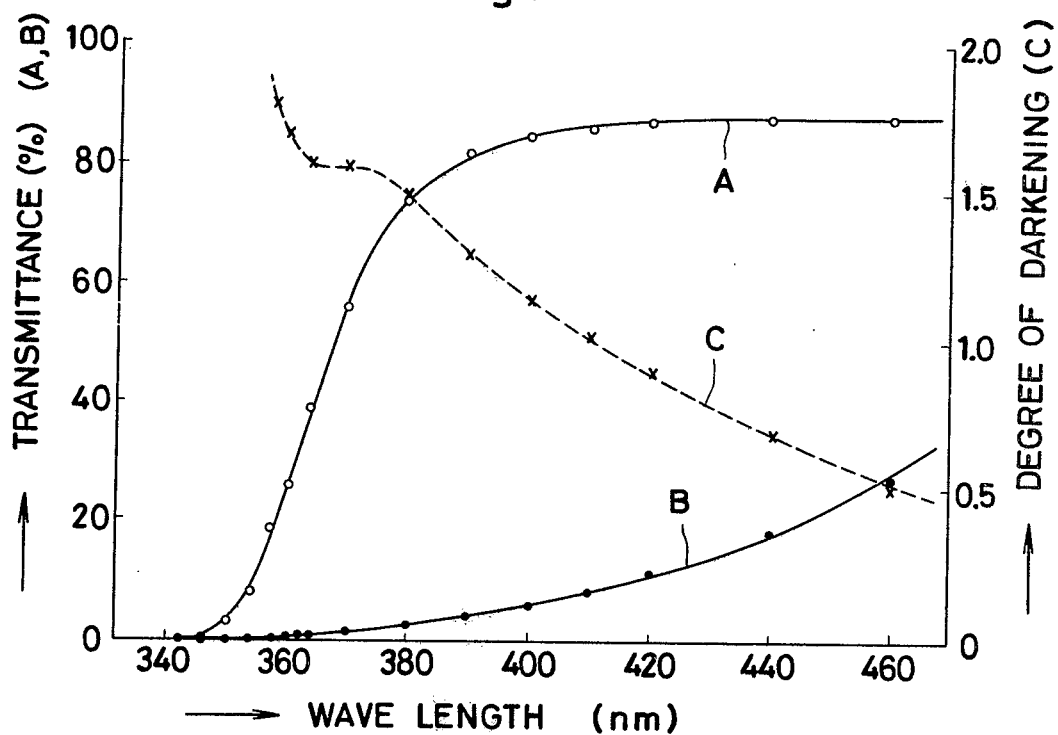
FIG. 1 is a characteristic diagram which indicates that the transmittance of the reversibly photosensitive glass of Test Run No. 6 of Table 1 at wavelengths ranging from 340 to 460 nm is varied by the exposure of the glass to ultraviolet rays.

First, the method for the manufacture of reversibly photosensitive glasses of the present invention will be described. As the raw materials for these glasses, there are used germanium dioxide ($GeO_2$) pure to the level of 99.9999%, silicon dioxide ($SiO_2$) pure to the level of 99.9999%, cadmium oxide (CdO) pure to the level of 99.99%, guaranteed-pure reagent grade sodium carbonate ($Na_2CO_3$) pure to the level of 99.5% and extra-pure reagent grade thallous oxide ($Tl_2O$) pure to the level of 99%, each in a powdered form. These raw materials are used in various combinations and not all are incorporated in any one of the glasses according to this invention.

Now, the manufacture of glass will be described. The raw materials are selected and weighed out in respectively prescribed amounts and are thereafter thoroughly mixed. The resultant mixture is placed in a platinum crucible and melted at temperatures ranging from 900° to 1100° C. in the case of a composition using $GeO_2$ or at temperatures ranging from 1300° to 1400° C. in the case of a composition using $SiO_2$. When the mixture incorporates cadmium oxide, the crucible must be covered to prevent sublimation. At least 30 minutes after the termination of the melting, the resultant molten mixture is suddenly cast in a desired mold to produce a shaped glass. Thereafter, the shaped glass is annealed at temperatures ranging from 400° to 500° C. for 20 min., and then cooled gradually to room temperature. Consequently, a colorless, transparent reversibly photosensitive glass of stable quality is obtained.

Various glasses of the present invention obtained by the method described above and their properties are shown in the following table.

Table 1

| Run No. | \multicolumn{5}{c}{Test Composition (by mol%)} | Absorption edge (nm) | Degree of darkening | \multicolumn{5}{c}{Half period for fading} |
|---|---|---|---|---|---|---|---|---|---|---|---|---|
| | | | | | | | | Room temperatures (Assumption) | Irradiating long-wavelength rays | | Heating | |
| | GeO$_2$ | SiO$_2$ | Na$_2$O | CdO | Ti$_2$O | | | | Kind of ray | Period | Heating condition | Period |
| 1 | 75 | | 10 | 15 | 1 | 326 | 0.3(355) | | | | | |
| 2 | 70 | | 30 | | 1 | 324 | 0.8(350) | more than 3 × 10$^5$ years | 450 μW/cm$^2$ 400 nm | 1.5hr | 220° C. about 50 sec. | * |
| 3 | 55 | | 15 | 30 | 1 | 368 | 0.5(405) | | | | | |
| 4 | 55 | | 30 | 15 | 0.1 | 309 | 0.9(330) | | | | | |
| 5 | 55 | | 30 | 15 | 0.3 | 322 | 1.3(345) | | | | | |
| 6 | 55 | | 30 | 15 | 1 | 342 | 1.6(370) | more than 100 days | 265 μW/cm$^2$ 410 nm | 2hr | 220° C. less than 2 minutes | * |
| 7 | 55 | | 30 | 15 | 3 | 370 | 0.9(400) | | | | | |
| 8 | | 50 | 15 | 35 | 0.1 | 304 | 0.4(330) | | | | | |
| 9 | | 50 | 15 | 35 | 0.3 | 312 | 0.5(340) | | | | | |
| 10 | | 50 | 15 | 35 | 1 | 328 | 0.5(370) | more than 3 years | 450 μW/cm$^2$ 400 nm | 3hr | 220° C. about 40 sec. | * |
| 11 | | 50 | 15 | 35 | 3 | 360 | 0.2(400) | | | | | |
| 12 | | 50 | 30 | 20 | 0.3 | 309 | 0.1(340) | | | | | |

*complete faded

The term "absorption edge" in the table above means the shortest wavelength of light at which a given test piece of glass 1.5 mm in thickness exposed to the light without any preparatory darkening treatment shows a transmittance of 0%. (The rays of light having shorter wavelengths are wholly absorbed by the test piece, while those having greater wavelengths are allowed to penetrate through the test piece and the transmittance is accordingly increased.)

The term "degree of darkening" means the difference in absorbance between a sample of a given glass which has been exposed to only the ultraviolet-ray portion of an ultra-high pressure mercury vapor lamp at the irradiation energy of 1.2 J/cm$^2$ and the absorbance of an unexposed sample of the glass, when both samples are exposed to light of a wavelength at which the transmittance of the unexposed sample is 50%.

The term "half period for fading" means the length of time required for the degree of darkening to become one half of the value which existed immediately after the cessation of the exposure of the glass to the darkening light.

Now, the photosensitive properties of the glass of Test Run No. 6 of Table 1 will be described in detail with reference to FIGS. 1 and 2.

FIG. 1 is a characteristic diagram which indicates that the transmittance of the reversibly photosensitive glass of Test Run No. 6 of Table 1 at wavelengths ranging from 340 to 460 nm is varied by the exposure of the glass to ultraviolet rays. In the diagram, the characteristics of transmittance versus wavelength which a sheet glass 1.5 mm in thickness exhibited after exposure for 1000 seconds to ultraviolet rays of an intensity of 1.2 mW/cm$^2$ obtained by passing the light from an ultra-high-pressure mercury vapor lamp through an ultraviolet-ray penetrating filter adapted to block the passage of the visible-ray portion of the light (with the irradiation energy of 1.2 J/cm$^2$) are indicated by Curve B and those which the same sheet glass exhibited before the aforementioned exposure are indicated by Curve A. The characteristics of degree of darkening (to be found by converting the values of Curves A and B into the respective absorbances and finding the difference between the values of such absorbances) versus wavelength are indicated by Curve C. From the diagram, it is apparent that the exposure of the glass to the ultraviolet rays brought about absorption having a wide spectrum from the absorption edge to the visible region. (This absorption is perceived as a change of color from colorless transparency to yellow or brown.)

Figure 2:
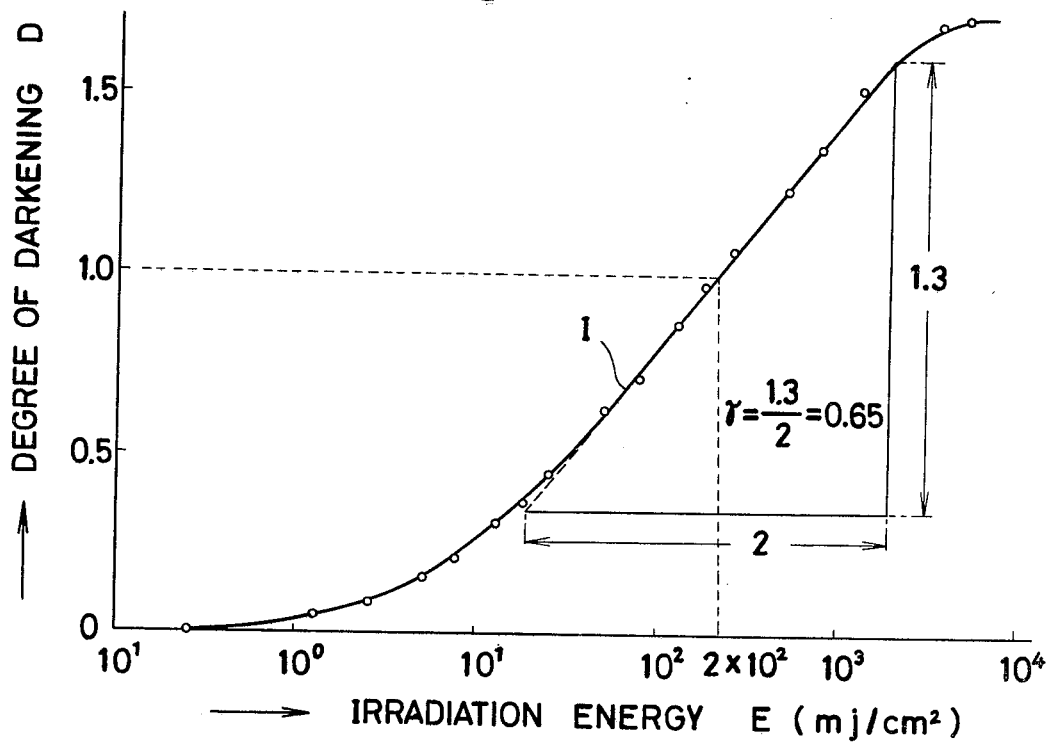
FIG. 2 is a graph showing the relation between the degree of darkening at 370 nm and the energy of the darkening light irradiated at 350 nm, determined with the reversibly photosensitive glass of the present invention (Test Run No. 6 in Table 1).

FIG. 2 is a characteristic curve obtained by following the method for the evaluation of the characteristics of ordinary photosensitive materials. In the graph, the horizontal axis is graduated for the irradiation energy of the darkening light (E) and the vertical axis for the degree of darkening (D). For the darkening treatment, a light with a wavelength of 350 nm substantially conforming with the wavelength at the absorption edge was adopted and the degree of darkening was obtained at a wavelength 370 nm at which the transmittance of the glass prior to its exposure to the darkening light was 50%. It is found from Characteristic Curve I that when the glass prior to its exposure to the darkening light was exposed to a 35-mJ/cm$^2$ irradiation of a light with a wavelength 350 nm, the glass showed a degree of darkening of 0.5.

When the same exposure is effected on a glass precipitating silver halide (such as, for example, a glass produced by Corning Glass Works and marketed under the trade-name of "PHOTOGREY"), the degree of darkening is only 0.1 even if the most effective darkening light (350 nm) and the wavelength capable of the highest darkening are adopted. It is, accordingly, plain that the reversibly photosensitive glass of the present invention possesses above five times the sensitivity of the silver halide-type glass. At maximum, the degree of the darkening obtainable with the glass of this invention even exceeds 1.7. The degrees of darkening obtainable with silver halide-type glasses range from 0.2 to 0.3. This fact clearly indicates that the darkening property of the reversibly photosensitive glass of the present invention is more than five times that of silver halide-type glasses. As concerns the gamma ($\gamma$) value which serves to indicate the contrast of image, the glass of this invention shows a value of not less than 0.6, a value equivalent to that of ordinary silver-halide type photographic films.

This gamma ($\gamma$) value is defined as tan $\alpha$ wherein $\alpha$ denotes the angle formed between the rectilinear portion of the characteristic curve and the horizontal axis of the graph, namely D/log E. In the case of the glass of Test Run No. 6, since in FIG. 2 D=1.3 and log E=2, the gamma ($\gamma$) value is found as follows: $\gamma = 1.3/2 = 0.65$.

The photosensitive properties of the reversibly photosensitive glass of the present invention conform to the law of reciprocity. This means that the degree of darkening obtained with the glass is determined by the irradiation energy of darkening light. As a result, the rate of the darkening increases in proportion to the intensity of the source of darkening light being used.

The irradiation energy (E), the irradiation intensity (I) and the duration of irradiation (T) are related to one another as indicated by the following equation:

$$E = I \times T$$

The energy required for the degree of darkening to equal 1 is found from the graph of FIG. 2 to be $2 \times 10^2$ mJ/cm$^2$. When the intensity of the darkening light is 10 mW/cm$^2$, for example, the time required for the degree of darkening to reach 1 (namely, the time required for the transmittance to decrease from 50% to 5%) is found to be about 20 seconds since $2 \times 10^2$ mJ/cm$^2$ = 10 mW/cm$^2 \times 20$ sec.

The half period for fading (the time required for the degree of darkening to become one half of the value existing immediately after cessation of the exposure of the glass to the darkening light) is estimated to be more than 100 days, a value notably great as compared with about 9 minutes found for the silver halide-type glass. Generally the reversibly photosensitive glasses of the present invention are characterized by their unusually long half periods for fading. The disadvantage of the conventional reversibly photosensitive glasses of having very short half periods for fading and, therefore, of being unsuitable for the preservation of images has been eliminated in the reversibly photosensitive glasses of the present invention.

A desired increase in the rate of fading is accomplished by exposing the glass to a light having a longer wavelength than the darkening light. The half period for fading of the present glass is about two hours when the glass is exposed to a light of 410 nm of wavelength at an irradiation intensity of 265 µW/cm$^2$, for example. A far more abrupt increase in the rate of fading is obtained by exposing the glass to heat. The transmittance can be completely returned to its original level within a matter of two minutes when the glass is raised to a temperature of 200° C. This phenomenon of fading by virtue of heat is accompanied by thermoluminescence. This particular phenomenon constitutes itself one of the characteristic features of the reversibly photosensitive glasses of the present invention.

The present invention has been described in detail above with reference to the glass of Test Run No. 6 of Table 1. It should be noted, however, that the reversibly photosensitive property varies to a fairly large extent with the composition of the glass.

In Table 1, the compositions of certain typical sheet-glass test pieces are shown by way of illustration in conjunction with their absorption edges, degrees of darkening and half periods for fading.

The darkening light which is most effective in darkening a given glass is a light of a wavelength substantially coinciding with that of the absorption edge. The absorption edge depends upon the composition and thickness of the glass. As indicated in the column under the heading "absorption edge" in Table 1, the absorption edges shift in the direction of increasing wavelengths in proportion as the contents of cadmium oxide and thallous oxide increase. By making effective use of this relationship, a composition capable of providing the most effective darkening for a specific darkening light source such as a laser light (having wavelengths in the range from 300 to 370 nm) can be selected.

One of the types of reversibly photosensitive glasses of this invention has the composition described below. This glass consists of CdO, GeO$_2$, Na$_2$O and Tl$_2$O.

Figure 3:
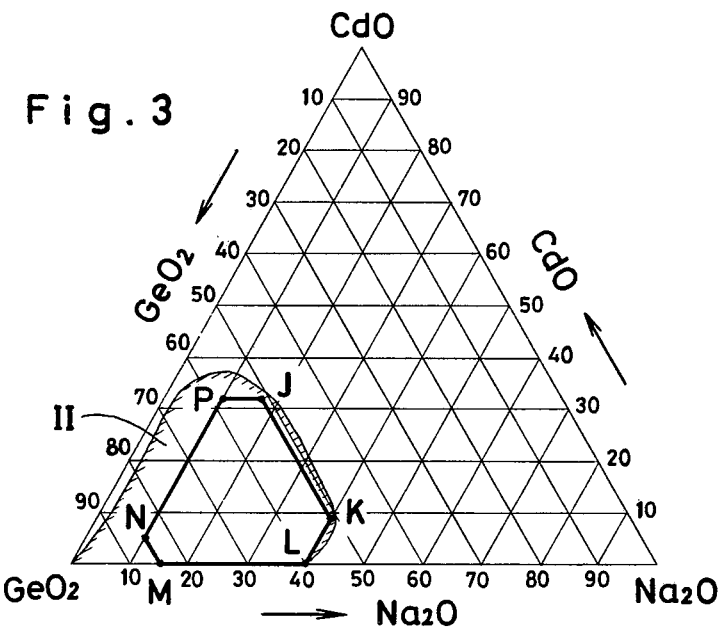
FIG. 3 is a ternary diagram showing the composition of CdO, $GeO_2$ and $Na_2O$ in one preferred embodiment of the glass of this invention.

FIG. 3 is a ternary diagram which illustrates the molar composition of the three major components CdO, GeO$_2$ and Na$_2$O of the glass. In the diagram, II denotes the glass formation region. The glasses of this invention consist of a composition having CdO, GeO$_2$ and Na$_2$O in the proportions falling within the area enclosed with straight lines connecting Point J (32 mol% of CdO, 51 mol% of GeO$_2$ and 17 mol% of Na$_2$O), Point K (9 mol% of CdO, 51 mol% of GeO$_2$ and 40 mol% of Na$_2$O), Point L (0 mol% of CdO, 60 mol% of GeO$_2$ and 40 mol% of Na$_2$O), Point M (0 mol% of CdO, 85 mol% of GeO$_2$ and 15 mol% of Na$_2$O), Point N (5 mol% of CdO, 85 mol% of GeO$_2$ and 10 mol% of Na$_2$O) and Point P (32 mol% of CdO, 58 mol% of GeO$_2$ and 10 mol% of Na$_2$O), plus 0.1 to 3 mol%, based on the combined amount of the composition, of Tl$_2$O.

Another types of reversibly photosensitive glasses according to this invention consist of CdO, SiO$_2$, Na$_2$O and Tl$_2$O.

Figure 4:
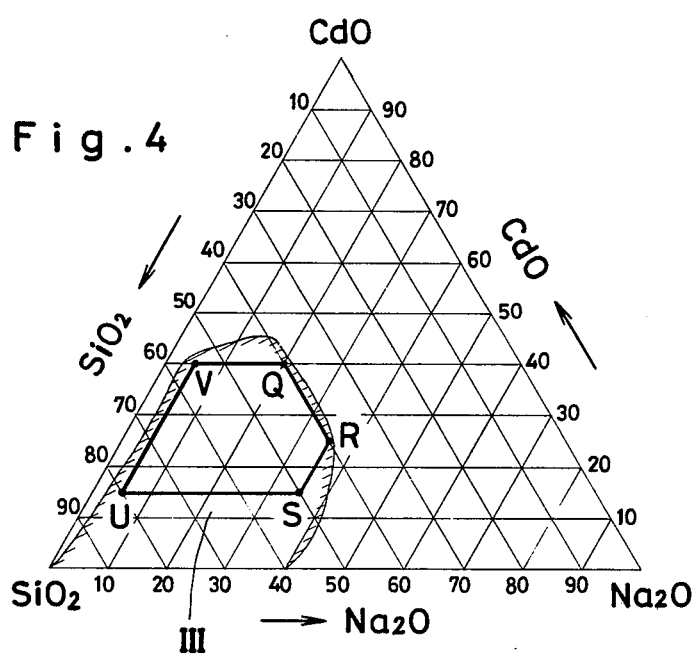
FIG. 4 is a ternary diagram showing the composition of CdO, $SiO_2$ and $Na_2O$ in another preferred embodiment of the glass of this invention.

FIG. 4 is a ternary diagram which illustrates the molar composition of the three major components CdO, SiO$_2$ and Na$_2$O of this glass. In the diagram, III denotes the glass formation region. The glass of this invention consists of a composition having CdO, SiO$_2$ and Na$_2$O in the proportions falling within the area enclosed with straight lines connecting Point Q (40 mol% of CdO, 40 mol% of SiO$_2$ and 20 mol% of Na$_2$O), Point R (25 mol% of CdO, 40 mol% of SiO$_2$ and 35 mol% of Na$_2$O), Point S (15 mol% of CdO, 50 mol% of SiO$_2$ and 35 mol% of Na$_2$O), Point U (15 mol% of CdO, 80 mol% of SiO$_2$ and 5 mol% of Na$_2$O) and Point V (40 mol% of CdO, 55 mol% of SiO$_2$ and 5 mol% of Na$_2$O), plus 0.1 to 3 mol%, based on the combined amount of the composition, of Tl$_2$O.

The reversibly photosensitive glasses of this invention contain no other components, with the exception of those impurities which are inevitably entailed by the starting raw materials.

The glasses according to the present invention are in their overall characteristics superior to conventional photosensitive glasses.

A study on the relation between the degree of darkening and the thallous oxide content reveals that the degree of darkening is particularly high when the amount of thallous oxide added to the composition is in the range of from 0.3 to 1 mol%. In the glass composition containing no thallous oxide, the degree of darkening is only 1/10 to 1/20 of the degree obtained in the glass composition containing thallous oxide as mentioned above. This indicates that the incorporation of thallous oxide is extremely important for the present invention.

In terms of chemical stability, the glasses indicated in FIG. 3, namely germanate glasses, tend to assume a clouded surface when they are exposed to an atmosphere of high humidity for a long time. In the case of the silicate glasses indicated in FIG. 4 there is no noticeable surface clouding due to the prolonged exposure to an atmosphere of high humidity. In terms of the sensitivity to the darkening light, germanate glasses are superior to silicate glasses.

As described in detail above, the reversibly photosensitive glasses of the present invention enjoy high photosensitivity and permit images to be preserved for a very long time.

What is claimed is:

1. A reversibly photosensitive glass, consisting of a composition having $CdO$, $GeO_2$ and $Na_2O$ in the proportions falling within the area enclosed with straight lines connecting Point J (32 mol% of CdO, 51 mol% of $GeO_2$ and 17 mol% of $Na_2O$), Point K (9 mol% of CdO, 51 mol% of $GeO_2$ and 40 mol% of $Na_2O$), Point L (0 mol% of CdO, 60 mol% of $GeO_2$ and 40 mol% of $Na_2O$), Point M (0 mol% of CdO, 85 mol% of $GeO_2$ and 15 mol% of $Na_2O$), Point N (5 mol% of CdO, 85 mol% of $GeO_2$ and 10 mol% of $Na_2O$) and Point P (32 mol% of CdO, 58 mol% of $GeO_2$ and 10 mol% of $Na_2O$), plus 0.1 to 3 mol%, based on the combined amount of the abovementioned components, of $Tl_2O$.

* * * * *